US005762967A

United States Patent [19]

Sagawa et al.

[11] Patent Number: 5,762,967

[45] Date of Patent: Jun. 9, 1998

[54] RUBBER MOLD FOR PRODUCING POWDER COMPACTS

[75] Inventors: Masato Sagawa; Hiroshi Nagata; Toshihiro Watanabe, all of Kyoto, Japan

[73] Assignee: Intermetallics Co., Ltd., Kyoto, Japan

[21] Appl. No.: 634,625

[22] Filed: Apr. 18, 1996

[30] Foreign Application Priority Data

Apr. 18, 1995 [JP] Japan ................................ 7-116537

[51] Int. Cl.$^{6}$ ................................................ B29C 45/17

[52] U.S. Cl. ............................ 425/3; 249/134; 264/108; 425/DIG. 33; 425/DIG. 44

[58] Field of Search ................................ 425/3, 174.8 R, 425/DIG. 33, DIG. 44; 249/134; 264/108

[56] References Cited

U.S. PATENT DOCUMENTS

| | | | |
|---|---|---|---|
| 3,085,291 | 4/1963 | Haes et al. | 425/3 |
| 3,274,303 | 9/1966 | Muller | 425/3 |
| 3,400,180 | 9/1968 | Buttner et al. | 425/174.8 R |
| 3,416,191 | 12/1968 | Richter et al. | 425/3 |
| 3,452,121 | 6/1969 | Cochardt et al. | 425/174.8 R |
| 4,661,053 | 4/1987 | Yokota et al. | 425/DIG. 33 |
| 5,135,375 | 8/1992 | Matsuo et al. | 425/3 |
| 5,446,428 | 8/1995 | Kumeji et al. | 333/185 |

*Primary Examiner*—Jay H. Woo
*Assistant Examiner*—Iurie Schwartz
*Attorney, Agent, or Firm*—Morrison & Foerster LLP

[57] ABSTRACT

A elastically and reversibly deformable rubber mold for producing powder compacts is made of a material at least a part of which is a mixture of rubber and magnetic powder. In use, this rubber mold filled with the magnetic powder and subjected to a magnetic field and pressure with punches, thereby compressing the powder to form powder compact. This makes the distribution of magnetic field in the cavity of the rubber mold more homogeneous, and therefore, the distortion, cracking and chipping caused by inhomogeneity of the distribution of the magnetic field are reduced, so that the shape of the resultant powder compact is closer to the end product.

9 Claims, 4 Drawing Sheets

RUBBER MOLD FOR PRODUCING POWDER COMPACTS

FIELD OF THE INVENTION

The present invention relates to a method for producing a powder compact in which a magnetic powder for pernament magnets and the like is packed in a cavity of a rubber mold, and then subjected to a magnetic field and compressed to form a powder compact. The present invention also relates to a rubber mold which is used in this method for producing a powder compact. The powder compact after pressing is subjected to processes such as sintering and curing and then becomes a product magnet product to be used in various industries.

BACKGROUND OF THE INVENTION

A method and a rubber mold for producing a powder compact have been known, which a cavity of a rubber mold comprising a urethane rubber or the like is filled with a magnetic powder, and then the rubber mold filled with powder is subjected to a magnetic field and compressed with punches to form a powder compact.

In the above mentioned method for producing a powder compact using a rubber mold, the magnetic field which is applied to the rubber mold filled with the magnetic powder is a pulsed magnetic field instead of a static magnetic field, because the pulsed field can generate a strong magnetic field while preventing the coil from generating heat. By applying such a pulsed magnetic field, powder particles of anisotropic magnetic material such as permanent magnets are oriented. The material, hardness, strength and the thickness of the rubber mold used in such method are important elements which influence the dimensional accuracy, generation of cracking or chipping, and the magnetic properties of the resultant powder compact.

When aligning the direction of crystals of magnetic powder particles i.e., carrying out magnetic alignment by applying a pulsed magnetic field to a magnetic powder in the rubber mold, it is preferable for the pulsed magnetic field to be applied uniformly to the cavity of the rubber mold. If the distribution of the pulsed magnetic field is not uniform in the cavity of the rubber mold, the powder particles in the cavity move from a region where there is a weak magnetic field to a region where there is a strong magnetic field. As a result, the powder compact is distorted upon pressing, and cracking or chipping occurs in the powder compact when the pressure is released.

SUMMARY OF THE INVENTION

It is a primary object of the present invention to provide a method and a rubber mold which prevent the powder compact from distortion or cracking and chipping caused by uneven distribution of a pulsed magnetic field.

To achieve this object, the present invention provides a method in which a magnetic powder is packed into a cavity of a rubber mold comprising a rubber material at least a part of which is a mixture of rubber and a magnetic powder, and then the rubber mold filled with the magnetic powder is subjected to a magnetic field and pressure with punches, thereby compressing the powder to form a powder compact.

In the present invention, the rubber mold is fabricated by using a rubber material in which a magnetic powder is mixed with rubber so that the whole or a part of the rubber mold comprises a magnetic material, by which the strength of the magnetic field applied to the space of the rubber mold cavity becomes uniform.

By molding the rubber mold with a rubber material comprising a rubber and a magnetic powder, the amount of magnetic material to be magnetized can be as much as the whole body or a desired part of the rubber mold, thereby enhancing the homogeneity of the distribution of the magnetic field in the space in which the cavity of the rubber mold is formed. Therefore, the distortion, cracking and chipping of the powder compact caused by inhomogeneity of the distribution of the magnetic field are prevented, and as a result, the powder is compacted to have improved magnetic properties, and to be as close as possible to the end product, what is called in the art to be "near-net-shape."

DETAILED DESCRIPTION OF THE INVENTION

Embodiments of the present invention will be explained below. In the explanation of the pre sent invention, a magnetic powder mixed in a rubber material for forming a rubber mold is hereinafter referred to as "magnetic powder for rubber mold", and a magnetic powder filled in a cavity of a rubber mold for producing a powder compact is referred to as "magnetic powder for compact".

The magnetic powder for rubber mold should preferably have an average grain size of 50 μm or less. More preferably, the grain size should be 20 μm or less for homogeneous distribution. Grain sizes over 50 μm are not preferable because the powder is likely to separate from the rubber material and tends to deposit in the rubber material. In addition, the particles of the magnetic powder for rubber mold should desirably have round edges, because if they have acute or sharp edges, the rubber mold tends to have cracks or gaps.

As the magnetic powder for rubber mold, preferred powders are metal or alloy powders whose main component is Fe and which have a large magnetization such as Fe (pure iron), Fe-C alloys, Fe-Co alloys, Fe-Co-V alloys, Fe-Cr alloys, Fe-Ni alloys, and Fe-Si alloys. In particular, powders of Fe-Co alloys and Fe-Co-V alloys are preferred because of their large magnetization and rust-preventive properties. The magnetic powder for rubber mold is not limited to soft magnetic materials, but may be hard magnetic materials such as Fe-Co-Cr alloys, Sm-Co alloys, Nd-Fe-B alloys and ferrite magnets.

The preferred mixing ratio of the magnetic powder for rubber mold is 1–40% by volume, and, more preferably, 5–30%. Too small a mixing ratio of the powder does not improve the moldability of the powder compact, and too large a mixing ratio of the powder causes the rubber to have low mechanical strength or makes the rubber so hard that it affects the moldability of the powder compact.

Figure 1:
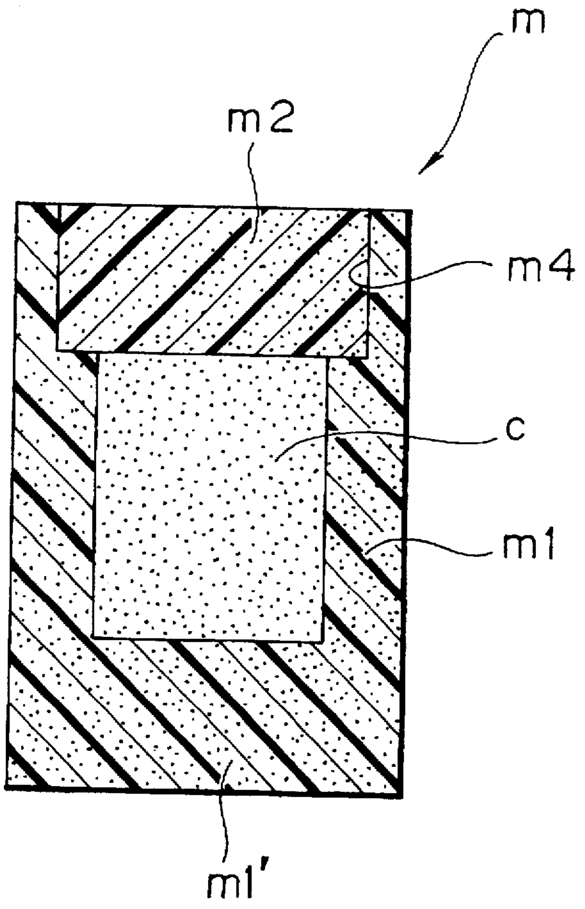
FIG. 1 is a vertical sectional view of an embodiment of the rubber mold used in the present invention.

As shown in FIG. 1, the rubber mold (m) comprising a body (m1) and a cover (m2) should desirably be made from a rubber material in which a magnetic powder is uniformly mixed and dispersed in a rubber.

Figure 2:
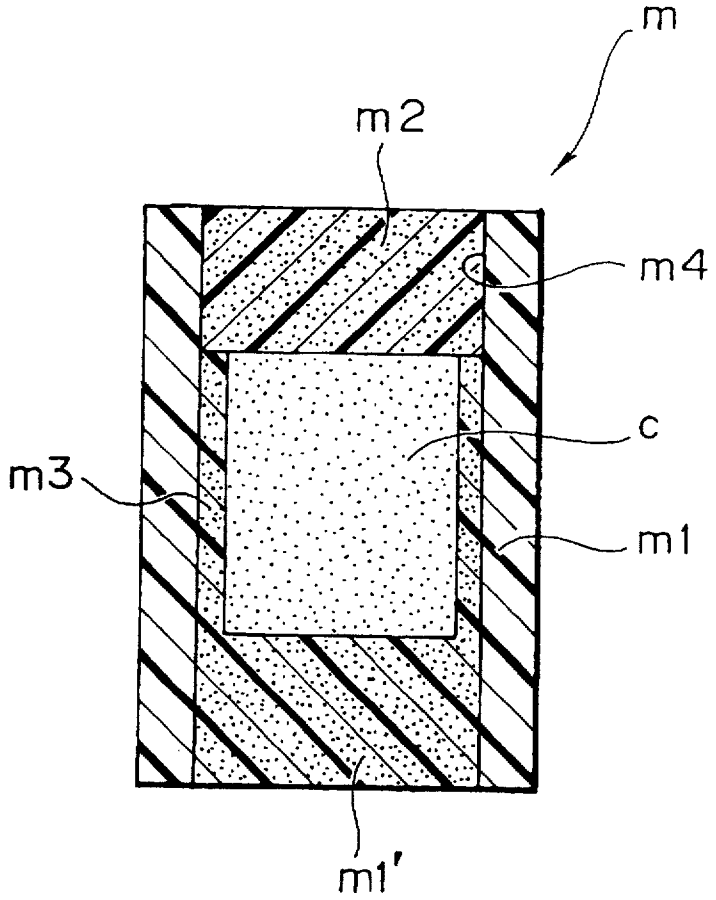
FIG. 2 is a vertical sectional view of another embodiment of the rubber mold used in the present invention.

However, the rubber material in which a magnetic powder is mixed with rubber may sometimes be so hard that it leads to generation of cracks or, chips in the powder compact obtained using the rubber mold (m). In such a case, as shown in FIG. 2, the bottom (m1') of the body (m1), the cover (m2) and a cylindrical part (m3) comprising a thin circumferential layer around the cavity (c) may be made from a rubber material containing a magnetic powder, while other parts of the rubber mold are made from a rubber material without containing a magnetic powder.

It is also possible to make the rubber mold (m), so that an outer circumferential part of the cover (m2) is, in a desired thickness, made from a rubber material which does not contain a magnetic powder.

The present invention makes it possible to prevent the powder compact from having so-called dimples i.e., hollows in the top and bottom, and from deforming into a barrel-shape, and furthermore, to improve the magnetic properties of the product and other important performance characteristics.

Contrary to these advantages, mixing the magnetic powder in a rubber mold makes the rubber mold hard, which may affect the molding of the powder compact depending on the kind of the magnetic powder for rubber mold and the shape of the powder compact.

When a small amount of a lubricant such as zinc-stearate is added to a Nd-Fe-B powder and mixed well, and the rubber mold whose cavity filled with the Nd-Fe-B powder at a high packing density is subjected to the magnetic field and the powder is aligned in one direction, a high degree of orientation can be obtained. When such a highly-oriented magnetic powder for compact is compressed, the magnets obtained after sintering have improved magnetic properties, in particular, high remanence magnetization ($B_r$) and maximum energy product ($BH_{max}$). Therefore, the resultant sintered magnets exhibit high performance.

However, because the addition of zinc-stearate degrades the strength of the powder compact, cracks and chips often occur in the powder compacts when they are taken out of the rubber mold. In the isostatic pressing method in which the magnetic powder for compact is pressed and highly oriented by using a rubber mold (Rubber Isostatic Pressing, hereinafter referred to as "RIP"), it is necessary to use a soft rubber as the material rubber for the rubber mold so as to prevent cracks and chips as above.

The Nd-Fe-B magnetic powder as a magnetic powder for compact has relatively good moldability when it does not contain a lubricant. However, if the desired powder compact has a shape such as a thin ring, flat board, or a long and narrow column, the powder compact is likely to suffer cracks and chips. By using a soft rubber material for the rubber mold, even if the desired powder compacts have such shapes, they can be pressed in good shape.

In order to produce the effect of mixing a magnetic powder in a rubber mold with a small amount .of the magnetic powder for rubber mold, it is possible to make the bottom (m1') of body (m1) and the cover (m2) from a rubber material containing a magnetic powder, while making other parts of the rubber mold (m) from a rubber material without containing the magnetic powder. The magnetic powder for rubber mold is mixed with rubber, and then cast in a mold and hardened. Prior to the hardening, the magnetic powder for rubber mold is subjected to a magnetic field and aligned in one direction, so that when the particles of the magnetic powder for rubber mold are forced to form strings in the direction of the magnetic field applied, the alignment can prevent the powder compact from having dimples or barrel-shaped deformation, as well as improve the magnetic properties of the compact and the resultant product, even if the amount of the magnetic powder contained in the rubber mold is small.

In this method, the magnetic powder for rubber mold should be aligned in a direction which is the same as the direction of the magnetic field which is applied to the powder that is to be compressed into a powder compact. By applying this method, the amount of the magnetic powder for rubber mold can be small while enhancing the effect of mixing the magnetic powder in the rubber mold, which prevents the rubber mold from becoming too hard, and therefore, pressing by RIP can be carried out in good shape even when using a magnetic powder for compact with poor moldability caused by lubricant addition, and even when the desired powder compact has a thin or a flat, or a long and narrow shape which is hard to press. The effects of the magnetic alignment of the magnetic powder mixed in the rubber mold will be discussed later in the examples.

The magnetic powder for rubber mold is mostly a soft magnetic powder such as Fe, Fe-Co and the like. When a magnetic field is applied to such powders, the magnetic powder particles are aligned and form strings in the direction of the magnetic field i.e., along the lines of the magnetic force. On the other hand, when the rubber mold is molded without applying a magnetic field, the magnetic powder for rubber mold is dispersed in random directions without forming strings.

Figure 3:
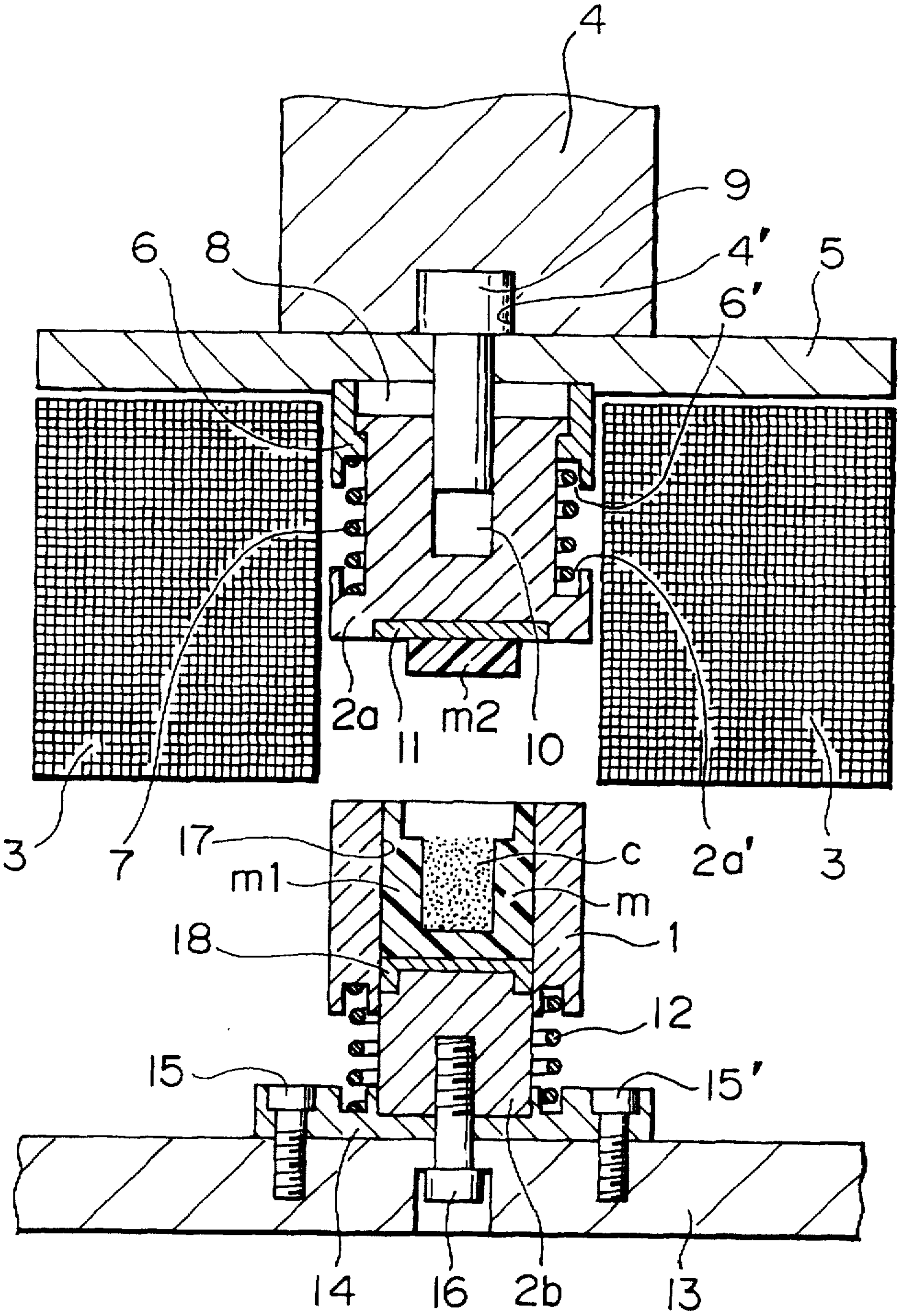
FIG. 3 is a vertical sectional view of an embodiment of the apparatus employed for carring out the present invention.

For reference, an embodiment of the pressing apparatus disclosed in the previous application in which powder compacts are produced by pressing with punches is described referring to FIG. 3, a vertical sectional view of the apparatus.

(m) is a rubber mold filled with a magnetic powder for compact at a high packing density, and (1) is a die in which the rubber mold (m) is loaded. (2*a*) is an upper punch and (2*b*) is a lower punch. (3) is a coil for generating a pulsed magnetic field and (4) is a press plunger. (5) is an upper punch supporting plate which is fixed to the press plunger (4), and to the upper punch supporting plate (5), a nearly cylindrical sleeve (6) is fixed. The upper part of the upper punch (2*a*) is fitted into the sleeve (6) in a slidable manner.

A spring (7) such as a coil spring or the like winds round the peripheral part of the upper punch (2*a*). The upper end of the spring (7) is fitted into a recess (6') provided in the sleeve (6), while the lower end of the spring (7) is fitted into a recess (2*a*') provided in the lower part of the upper punch (2*a*). A space (8) is formed by the upper surface of the upper punch (2*a*), the inner peripheral surface of the sleeve (6) and the bottom surface of the upper punch supporting plate (5). A bolt (9) fitted into the recess (4') provided in the central part of the bottom of the press plunger (4) penetrates the above mentioned supporting plate (5). The end of the bolt (9) is inserted into a space (10) provided along the axial line in the central part of the upper punch (2*a*) in a slidable manner.

The cover (m2) is provided for covering the cavity (c) of the body (m1) of the rubber mold (m), which prevents the magnetic powder for compact from popping out of the rubber mold (m) when the magnetic field is applied. A back-up plate (11) is fitted into the bottom of the upper punch (2*a*), which is made of hard rubber or the like and plays the role of sealing the rubber mold (m), preventing the rubber mold (m) from sticking out.

The die (1) is cylindrically formed and supported by a supplemental supporting plate (14) provided on an indexed table (13) through a spring means (12) such as a coil spring or plate springs. The resiliency of spring means (12) is far stronger than that of the above mentioned spring (7) winding round the upper punch (2a). On the indexed table (13), stages for each process such as a powder packing stage at which a magnetic powder for compact is packed in the rubber mold (m) are provided, although not shown in the Figure. The indexed table (13) rotates intermittently so that the desired process is carried out at each stage.

The supplemental supporting plate (14) is fixed by the indexed table (13) with bolts (15), (15') and the lower punch (2b) is fixed by the supplemental supporting table (14) with a bolt (16). The die (1) is inserted into the lower punch (2b) in a slidable manner, and the body (m1) of the rubber mold (m) is loaded into a recess (17) which is formed by the die (1) and the lower punch (2b).

A back-up plate (18) of hard rubber or the like is provided on the upper surface of the lower punch (2b), which prevents the rubber mold (m) from sticking out. A die set fixed to the indexed table (13) comprises the die (1), the lower punch (2b) and the like.

In the above described pressing apparatus, the lower punch (2b) is secured and the upper punch (2a) is moved downward by the descent of the press plunger (4), thereby pressing the rubber mold (m) filled with the magnetic powder for compact and loaded in the die (1), between the upper punch (2a) and the lower punch (2b). Contrary to this, it is possible to secure the upper punch (2a) and attach the press plunger (4) to the lower punch (2b) which is moved by up-down movement of the press plunger (4), thereby pressing the magnetic powder for compact filled in the rubber mold (m).

The movement of the above mentioned apparatus is hereinafter described.

Starting from the condition with the upper punch (2a) standing by as shown in FIG. 3, the press plunger (4) is lowered to put the bottom of the upper punch (2a) on the upper surface of the die (1). Simultaneously, the cover (m2) attached to the bottom of the upper punch (2a) is put on the body (m1) of rubber mold (m) whose cavity (c) is filled with the magnetic powder for compact, when the lowering of the press plunger (4) is stopped. Then an electric current is sent into the coil (3) to apply a pulsed magnetic field to the rubber mold (m) so that the magnetic powder for compact in the cavity (c) is magnetically aligned.

Following the alignment process in which the magnetic powder for compact packed in the cavity (c) of the body (m1) is aligned by the application of the pulsed magnetic field, the press plunger (4) is lowered again, when the spring (7) is contracted and the space (8) between the upper punch (2a) and the supporting plate (5) is diminished until the upper end of the upper punch (2a) comes into contact with the supporting plate (5). The spring (7) is contracted along with the descent of the press plunger (4) in such a way as described above. However, because the resiliency of the spring means (12) supporting the die (1) is far larger than that of the spring (7), the upper punch (2a) does not move down, while the spring (7) is contracted.

When the press plunger (4) is further lowered from the state described above, the upper punch (2a) is pressed by the supporting plate (5) and moves down, resisting the resiliency of the spring means (12), and eventually presses the die (1) down. Therefore, the recess (17) formed by the die (1) and the lower punch (2b) is diminished and the rubber mold (m) loaded in the recess (17) is compressed together with the magnetic powder for compact packed in the cavity (c) of the body (m1). After lowering the upper punch (2a) for a desired time, the press plunger (4) is stopped, when the pressing process, in which the rubber mold (m) is pressed between the upper punch (2a) and the lower punch (2b), is stopped. Subsequently, the press plunger (4) is lifted and the upper punch (2a) is returned to the stand-by state shown in FIG. 3. A powder compact is obtained through these steps.

Examples of the present invention are now discussed, and a comparative example is also described in comparison with the Examples.

[EXAMPLE 1, EXAMPLE 2, AND COMPARATIVE EXAMPLE]

In Example 1, the rubber mold (m) consisting of the body (m1) and the cover (m2) was made as shown in FIG. 1. The body (m1) was 80 mm in height, 50 mm in outside diamater, and the bottom (m1') was 20 mm thick. The cavity (c) consisting of a columnar space in which the magnetic powder for compact was packed was 30 mm in diamater and 40 mm in depth. The columnar space (m4) into which the cover (m2) was fit had a diamater of 40 mm and a height of 20 mm. The cover (m2) fit into cylindrical space (m4) was formed as a column with 20 mm in height and 40 mm in outer diamater.

The material rubber was a urethane rubber with a hardness of 10 (JIS-A). The body (m1) and the cover (m2) were produced with a rubber material composed of said material rubber and a Fe-Co powder with an average particle size of 10 μm mixed in an amount of 15% in volume. The mixture was cast into the body (m1) and the cover (m2) having dimensions as above.

The Fe-Co alloy used here was an alloy composed of 50% Fe and 50%, Co by weight. This magnetic powder for rubber mold was added to the material liquid rubber before hardening, then stirred enough and injected into a mold to form the body (m1) and the cover (m2).

For Example 2, a rubber mold (m) composed of the cylindrical rubber mold body (m1) and the columnar cover (m2) was made. The body (m1) was 80 mm in height, 50 mm in outside diameter, and had a bottom (m1') of 20 mm thick. The cavity (c) had a diameter of 30 mm and a height of 40 mm. The columnar space (m4) into which the cover (m2) was fit had a diameter of 34 mm and a height of 20 mm.

A rubber material was prepared by mixing a urethane rubber with a hardness of 10 (JIS-A) with a Fe-Co alloy powder consisting of 50% Fe and 50% Co by weight whose average grain size was 10 μm. The rubber material was used to form the thin cylindrical part (m3) to have an outside diamater of 34 mm and a height of 60 mm which surrounds cavity (c) and extends to the lower end of bottom (m1'). The columnar cover (m2) 20 mm in height and 34 mm in diameter was made by using the same rubber material. The other part of rubber mold (m) was made from a urethane rubber with a hardness of 8 (JIS-A). The rubber mold (m) made up of these parts was loaded in a nonmagnetic, stainless die with an inside diameter of 50 mm, an outside diameter of 70 mm and a height of 90 mm.

Figure 4:
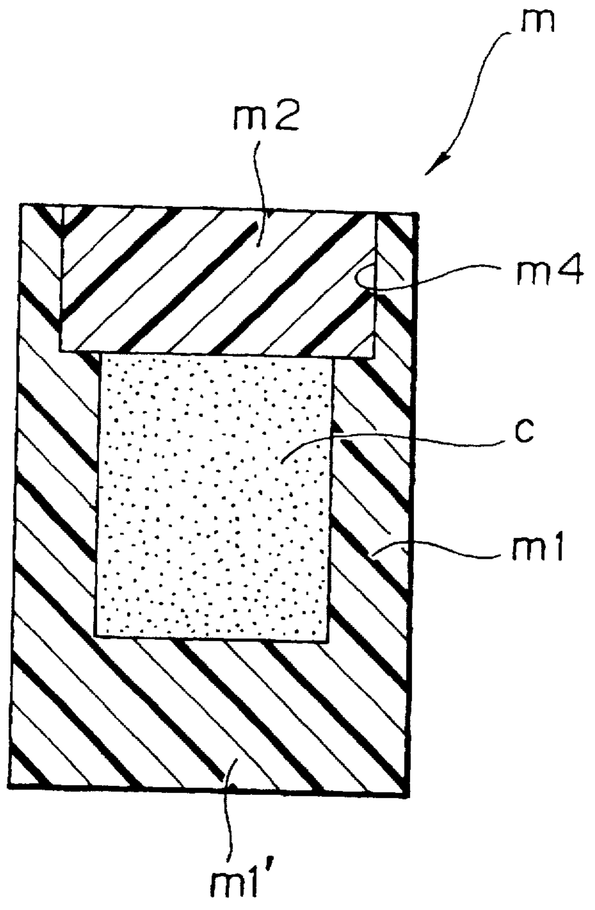
FIG. 4 is a vertical sectional view of the rubber mold used in the conventional pressing.

As a Comparative Example, the rubber mold (m) shown in FIG. 4 consisting of the cylindrical body (m1) and the columnar cover (m2) was made from a urethane rubber with a hardness of 8 (JIS-A). The dimensions of the body (m1) and the cover (m2) were the same as those in Example 1. The body (m1) was 80 mm in height and 50 mm in outside diameter, and the bottom (m1') was 20 mm thick. The cavity (c) in which the magnetic powder for compact was packed had a diameter of 30 mm, a height of 40 mm. The columnar space (m4) into which the cover (m2) was fit was 40 mm in diameter and 20 mm in height. The cover (m2) was formed as a column 20 mm in height and 40 mm in diameter. This rubber mold (m) was loaded in the same die as in the above Examples.

A Nd-Fe-B powder for sintered magnets having an average grain size of 4 μm was packed in each cavity (c) of the body (m1) of Examples 1 and 2, and the Comparative Example to have a packing density as high as 2.7 g/cm$^3$. The composition of the alloy powder to be compacted in the cavity (c) was, by weight ratio, 28.5% Nd, 3.5% Dy, 0.99% B, with the balance Fe. Each body (m1) was loaded in the die, covered with the cover (m2), and put into the coil (3) for generating the pulsed magnetic fields. A pulsed magnetic field with a peak strength of 40 kOe was applied to each rubber mold (m) in its axial direction, and then each rubber mold (m) was compressed with the punches at a pressure of 0.7 t/cm$^2$. A cylindrical powder compact was taken out from each cavity (c) of the rubber mold (m). Subsequently, each powder compact was sintered in a vacuum at 1060° C. for two hours, and then subjected to a heat treatment in an Ar gas atmosphere at 600° C. for two hours.

The cylindrical powder compacts produced with the rubber mold of the Comparative Example dimpled as deep as 2 mm from the surface in the center of the top and bottom. In addition, the side wall of the cylindrical powder compact was barrel-shaped i.e., the diameter of the center part was 1.4 mm larger than the diameter of the top and bottom. Cracking and chipping often occurred in such cylindrical parts.

The cylindrical powder compacts produced in accordance with Example 1 did not have such dimples or barrel-deformations, nor did they suffer from cracking or chipping. However, the powder compacts occasionally cracked unless the pressure was slowly released after pressing.

The optimal cylindrical powder compacts were those produced by using the rubber mold in Example 2, which had no dimples, cracks or chipping, and no barrel-deformations. Moreover, the powder compacts did not break even when the pressure was released quite fast after the pressing.

The magnetic properties of the powder compacts obtained in Examples 1 and 2 were better than those in the Comparative Example. Many samples were made by using the rubber molds of the Examples and the Comparative Examples, and their magnetic properties were compared.

On the average, the maximum energy product of the magnets obtained in Examples 1 and 2 was 1–2 MGOe higher than that of magnets obtained in the Comparative Example. Practically, the more important result was that in the Comparative Example, the magnetically aligned direction was disturbed by the generation of dimples in the top and bottom.

The partial variation of the magnetic properties in dimpled parts of the cylindrical powder compact was measured with a vibrating sample magnetometer.

As a result, the magnetic property of the dimpled part in which the orientation is disturbed was 2 MGOe lower than that of the central part of the cylindrical compact. Most magnet products have thin and flat configurations. Magnets such as magnets for motors are produced from cylindrical parts compacted as above by slicing them with a diamond cutter or the like into thin ring magnets.

The sintered magnets obtained after sintering the powder compacts pressed by using the rubber mold in the Comparative Example had dimples as described above. Because the part around the dimple had lower magnetic properties than those of the central part, the ring magnets obtained by slicing such a compact varied in magnetic properties.

On the contrary, the cylindrical magnets obtained by using the rubber mold in Examples 1 and 2 did not suffer from dimples, and there was no or little difference in magnetic properties between the central part and the vicinity of the top and bottom of the cylindrical magnet. Therefore, magnets obtained by slicing such a cylindrical magnet had magnetic properties with little variance.

[EXAMPLE 3]

The rubber mold (m) as shown in FIG. 1 was made to have the body (m1) having a 80 mm deep cavity (c), and a height of 120 mm. The inner diameter of the cavity (c), outer diameter of the body (m1), thickness of the bottom (m1') and thickness of the cover (m2) were 30 mm, 50 mm, 20 mm and 20 mm, respectively, which were the same as in Example 1 above. The rubber mold (m) with such dimensions was made by the following two different methods, A and B.

A: A Fe-Co alloy powder was mixed with a silicon rubber liquid with a hardness of 10. The mixing ratio of the alloy was varied to be 5%, 10%, 15%, 20%, 25%, and 30% by volume. Each of the mixed material was injected into a mold and hardened as it was to form a rubber mold.

B: The mixture comprising the same rubber liquid and the same magnetic powder as in A was injected into a mold, and before it hardened, the mold with the powder was placed into a coil and then subjected to a magnetic field of 10 kOe in the direction of the axis of the cylinder in FIG. 1. After the application of the magnetic field, the mold was kept still, being prevented from vibration until it hardened to form a rubber mold.

The Fe-Co alloy powder used was the same as in Example 1.

Twelve kinds of rubber molds i.e., six kinds each made by methods A and B were prepared in total. Each of these rubber molds was put into a cylindrical stainless die with an outer diameter of 70 mm, an inner diameter of 50 mm, and a height of 140 mm. Nd-Fe-B alloy powder was packed in the cavity of the rubber mold, and the cover was put on. Then the rubber mold packed with the magnetic powder for compact was magnetically aligned and compressed to obtain the powder compact. The Nd-Fe-B magnetic powder as a magnetic powder for compact had the same composition and grain size as in Example 1, except that 0.05 wt % zinc stearate powder was added. The packing density of the Nd-Fe-B alloy powder in the rubber mold was 3.0 g/cm$^3$. An AC damping pulsed magnetic field with a peak strength of 20 kOe was applied in the direction of the axis of the cylindrical die, and subsequently, a DC pulsed field with a peak strength of 20 kOe was applied in one direction which was the same as the direction of the said AC damping pulsed magnetic field at its peak. After that, the rubber mold was compressed with the upper and lower punches to obtain the powder compact of the Nd-Fe-B magnetic powder. The pressure applied was 0.7 t/cm$^2$. The resultant powder compact was sintered and subjected to a heat-treatment under the same conditions as in Example 1.

The molding performances of the powder compacts obtained by using the six kinds of rubber mold mentioned above and the maximum energy product $(BH)_{max}$ of the resultant sintered magnets are shown in Table 1. For comparison, a result obtained from a rubber mold not containing Fe-Co alloy powder is also shown. In the case of using a Nd-Fe-B powder without adding zinc stearate powder, the magnetic property i.e., $(BH)_{max}$ of the sintered magnets was in the range of 36–37 MGOe.

TABLE 1

| Content of Fe-Co alloy powder | Cracks in the powder compact | | Dimples in the powder compact | | Maximum Energy Product $(BH)_{max}$ (MGOe) | |
|---|---|---|---|---|---|---|
| (%) | A | B | A | B | A | B |
| 0 | ○ | ○ | X | X | 36.1 | 35.9 |
| 5 | ○ | ○ | Δ | ○ | 37.5 | 38.1 |
| 10 | ○ | ○ | Δ | ○ | 37.9 | 38.6 |
| 15 | Δ | ○ | Δ | ○ | 38.0 | 38.7 |
| 20 | Δ | Δ | ○ | ○ | 38.3 | 38.3 |
| 25 | X | X | ○ | ○ | — | — |
| 30 | X | X | ○ | ○ | — | — |

○: None of the powder compacts had cracks or dimples
Δ: Some of the powder compacts had cracks or dimples
X: All of the powder compacts had cracks or dimples
—: Data was not obtained due to cracking of the samples.

As shown in Table 1, the magnets produced by using rubber molds containing c powder for rubber mold have larger maximum energy products $(BH)_{max}$, which are improved compared to that of the magnets produced by using a rubber mold which does not contain the magnetic powder for rubber mold.

Being constructed as described above, the present invention has the following effects:

By making a rubber mold from a rubber material comprising a rubber and a magnetic powder for rubber mold, the magnetic body to be magnetized becomes as large as the whole body of the rubber mold or a desired part of the rubber mold. This makes the distribution of magnetic field in the cavity of the rubber mold more homogeneous, and therefore, the distortion, cracking and chipping caused by inhomogenity of the distribution of the magnetic field are reduced and the resultant powder compact becomes more near-net-shaped i.e., closer to the end product.

In the production of fully-densified magnets by sintering, or resin-bonded magnets by hardening the resin, the present invention makes it possible to provide the magnets with improved magnetic properties which are homogeneous throughout the whole body of the powder compact. Therefore, magnets with a stable quality can be produced by this invention.

What is claimed is:

1. An elastically and reversibly deformable rubber mold for producing a powder compact, wherein at least a part of said rubber mold comprises a mixture of rubber and magnetic powder.

2. An elastically and reversibly deformable rubber mold for producing a powder compact, the mold including a body and a cover, wherein the whole body of the rubber mold comprises a mixture of rubber and magnetic powder.

3. An elastically and reversibly deformable rubber mold for producing a powder compact, the mold including a body having a bottom, a cover and an inner circumferential layer within the body, wherein the bottom, the cover and the inner circumferential layer of the rubber mold comprise a mixture and magnetic powder.

4. An elastically and reversibly deformable rubber mold for producing a powder compact, the mold including a body having a bottom, a cover and a circumferential side wall, the body and the cover comprising a mixture of rubber and magnetic powder, and the circumferential side wall comprising a rubber material without containing magnetic powder.

5. A rubber mold for producing a powder compact as claimed in one of claims 1–4, in which the magnetic powder particles contained in the rubber mold are aligned in strings in the same direction.

6. An elastically and reversibly deformable rubber mold containing an amount of a powder sufficient for producing a powder compact, wherein at least a part of said rubber mold comprises a mixture of rubber and magnetic powder.

7. An elastically and reversibly deformable rubber mold containing therein an amount of a powder sufficient for producing a powder compact, the mold including a body and a cover, wherein the whole body of the rubber mold comprises a mixture of rubber and magnetic powder.

8. An elastically and reversibly deformable rubber mold containing an amount of a powder sufficient for producing a powder compact, the mold including a body having a bottom, a cover and an inner circumferential layer within the body, wherein the bottom, the cover and the inner circumferential layer of the rubber mold comprise a mixture of rubber and magnetic powder.

9. An elastically and reversibly deformable rubber mold containing an amount of a powder sufficient for producing a powder compact, the mold including a body having a bottom, a cover and a circumferential side wall, the body and the cover comprising a mixture of rubber and magnetic powder, and the circumferential side wall comprising a rubber material without containing magnetic powder.

* * * * *